Figure 1A:
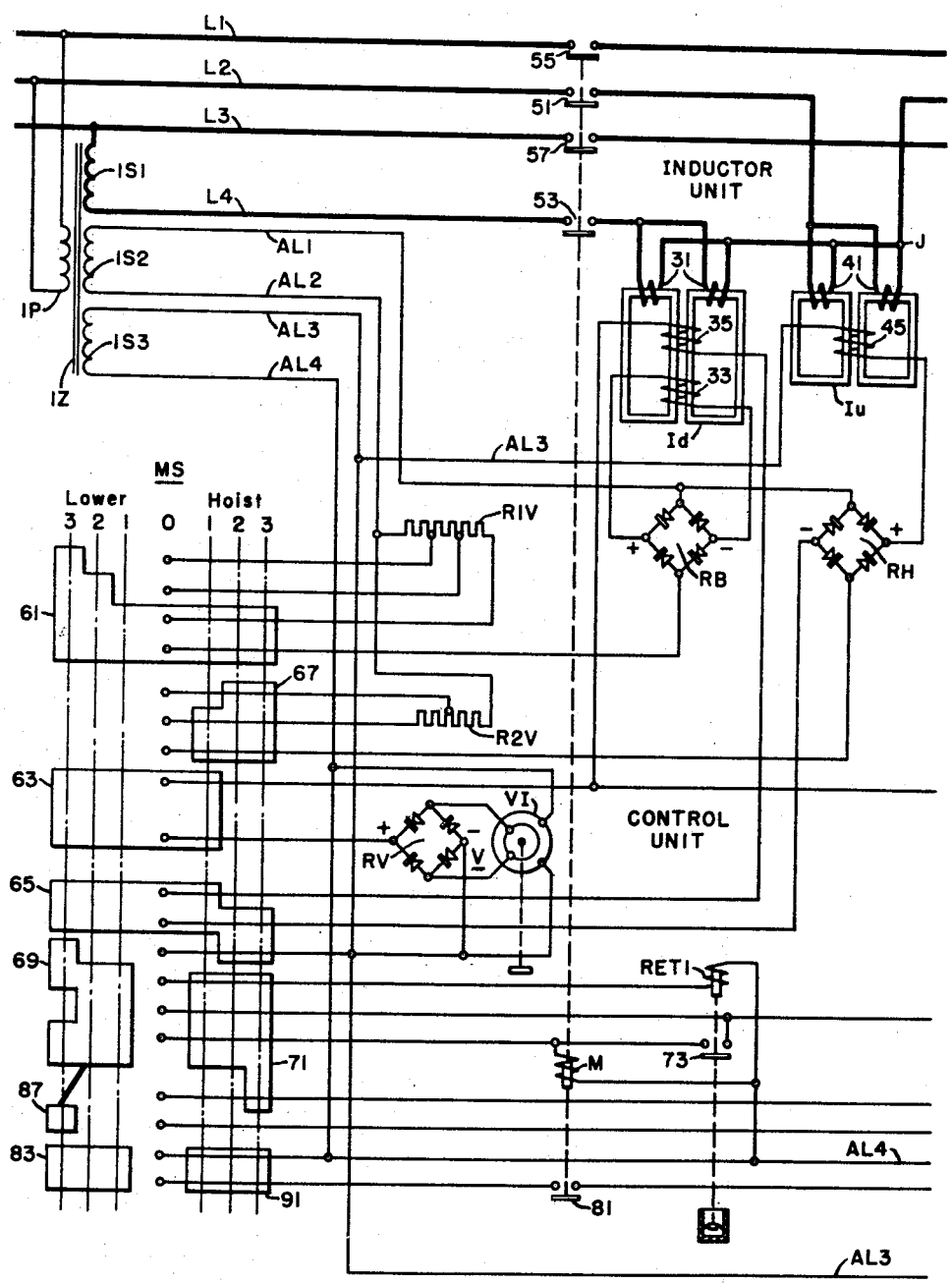

Jan. 19, 1960

W. R. WICKERHAM 2,922,096

MOTOR CONTROL APPARATUS

Original Filed Nov. 1, 1954

7 Sheets-Sheet 1

WITNESSES

INVENTOR
William R. Wickerham
BY
ATTORNEY

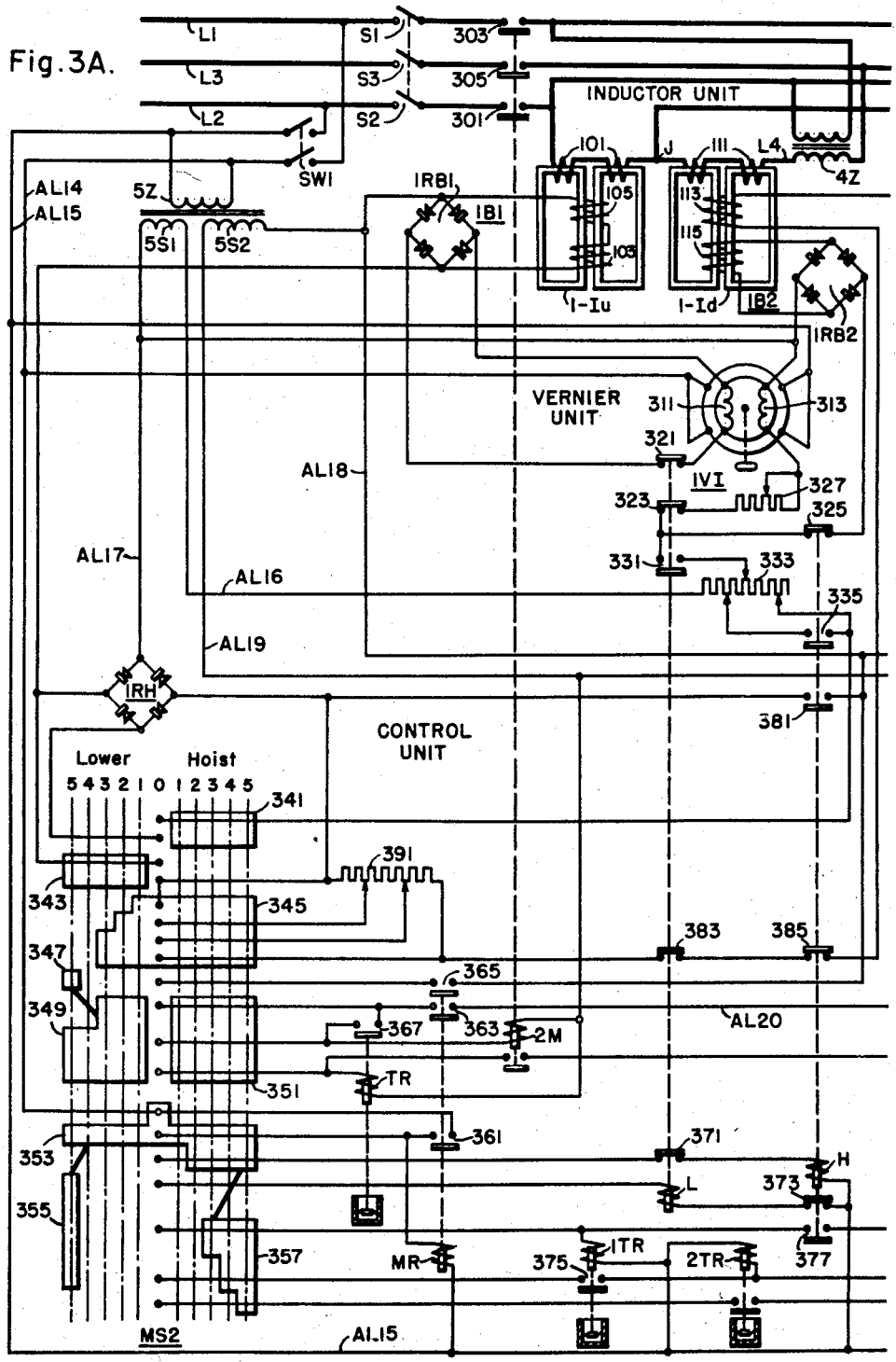

United States Patent Office 2,922,096
Patented Jan. 19, 1960

2,922,096
MOTOR CONTROL APPARATUS

William R. Wickerham, Buffalo, N.Y., assignor to Westinghouse Electric Corporation, East Pittsburgh, Pa., a corporation of Pennsylvania Original application November 1, 1954, Serial No. 521,104, now Patent No. 2,832,024, dated April 22, 1958. Divided and this application October 21, 1957, Serial No. 691,415

12 Claims. (Cl. 318—207)

This invention relates to motor control apparatus and has particular relation to motor control apparatus for controlling hoist motors, such as are used in the operation of cranes. This application is a division of Patent 2,832,024, granted April 22, 1958, and assigned to Westinghouse Electric Corporation.

Hoist motors are usually of the three-phase induction type and are supplied from a commercial three-phase source. Such motors drive a so-called hook to which the load may be attached. It is customary to refer to the "load on the hook" in describing the load to which the motor is subjected. In operating hoists or cranes, it is desirable that the motor driving the hoist or crane be precisely controllable. Thus, it is essential that when a raising operation is started a high torque be available. At the start of the operation the motor speed should, in addition, be low, so that when there is load on the hook, jerking of the load is avoided and when there is no load on the hook, precipitous raising of the hook is avoided. It is also desirable that the speed and torque be low at the start of a lowering operation, particularly if there is no load on the hook. If there is a load on the hook, it is desirable that the direction in which the motor exerts torque be readily reversible to suppress excessive tendency of the load to overhaul the motor. It is then essential that a full range of controllable torque be available at low lowering speeds. Naturally, it is desirable that this condition be met without supplying excessive currents to the motor.

Apparatus in accordance with the teachings of the prior art is typified by Wickerham Patent 2,440,319. In this case, the motor (HM, Fig. 1) is supplied through two sets of inductors (A1, A2, B1, B2) which are connected between two of the phase buses (L1, L2) of the supply and two of the terminals (T1, T2) of the motor. The inductors are controlled to unbalance the phase of the potential supplied to the motor and in this manner to control the speed and the direction of rotation of the motor. The apparatus disclosed in this patent has been found to operate reasonably satisfactorily but it has the disadvantage of complexity, in that it requires at least four inductors, each of which draws load current and absorbs a portion of the potential available from the supply. In addition, the control is complicated, including two sets of variable resistors (CA and CB) one associated with inductors A1 and A2 and the other with inductors B1 and B2.

It is, accordingly, broadly an object of this invention to provide a hoist drive of relatively simple structure involving relatively simple operating requirements and at the same time including facilities for providing a full range of controllable torque at all speeds of the hoist motor, and particularly at low lowering speeds, and affording high precision in load handling.

A hoist drive of simple structure is disclosed in Patent 2,774,923, granted December 18, 1956. In this drive the motor is supplied with power from a so-called duplex interconnected three-phase system. Such a supply consists essentially of two delta connected three-phase supplies having in common two of their supply conductors (11—L3, Fig. 1, parent), the third conductors (L2—74, Fig. 1) of each supply being at opposite phase potentials. Instead of the four inductors of Patent 2,440,319, the drive disclosed in Patent 2,774,923 includes only a pair of inductors (MR and BR) which are connected in series between the opposite phase conductors of the two supplies. Two of the terminals of the motor are connected to the common conductors and the third to the junction of the inductors.

In the apparatus disclosed in Patent 2,774,923 the inductors are controlled from three principal control components which supply three potentials, a potential (R4, Fig. 1) responsive to the load on the motor, that is, to the weight being lowered or lifted, a potential (PG) responsive to the speed of the motor and a vernier potential (VS) which is set to achieve the speed best suited to each operation. In accordance with the teaching of this patent the three potentials are impressed in series.

The apparatus disclosed in Patent 2,774,923 has, on the whole, been found to operate satisfactorily, but its operation has not been as precise as is desirable for many of the hoist problems encountered. In addition, the structure of the apparatus disclosed in this patent is still relatively complex.

It is, accordingly, specifically an object of this invention to provide apparatus of the general type disclosed in Patent 2,774,923 which shall be more precisely controllable than the apparatus disclosed in this patent.

It is another object of this invention to provide apparatus of relatively simple structure for controlling the speed and torque of a motor, particularly a hoist motor, which, in spite of the simplicity of its structure, shall afford the operator facilities for achieving the most propitious speed and torque for each condition under which the motor is operated.

It is an incidental object of this invention to provide a novel inductor circuit.

This invention arises from the realization that the connection of the vernier potential in series with the weight responsive and speed responsive potentials in the drive disclosed in the parent application reduces the precision of the apparatus disclosed in the parent application. It has been discovered that this reduction in precision arises from the fact that when the three potentials are impressed in series the effect of the vernier potential is reduced by the resistance of the speed responsive mechanism, which is usually a tachometer, and the weight responsive rectifier. This reduction in effect is accentuated by the fact that the circuit including the tachometer and the weight responsive rectifier usually has a high resistance compared to the vernier circuit. In accordance with this invention then the vernier potential is supplied to control the inductors independently of the speed and weight responsive potentials. Specifically, the vernier potential is impressed across the control windings of the inductors in parallel with the speed and weight responsive potentials.

In accordance with a further aspect of this invention, a vernier potential source is provided which supplies two separate components, one to the input windings of one inductor and the other to the input windings of the other inductor. These components are again impressed independently of the weight responsive and speed responsive components and may be controlled so as to afford the operator the facility for setting the motor to produce any speed and torque desired within narrow limits. The vernier components in this case are, in one embodiment of this invention, supplied through a pair of magnetic amplifiers, and in a modification of this invention, supplied from the outputs of an inductor unit.

Still another aspect of this invention is specifically tied up with the control of the rotor resistance of the motor in the later stages of a hoisting operation. In accordance with the usual practice, resistances are connected in the rotor circuit of the motor and during the later stages of a hoisting operation these resistances are, in part or in whole, shunted out. In accordance with a specific aspect of this invention, the contactor which shunts out the resistors during a late stage of the operation also shunts out the hoist (or up) inductor, the impedance of which is reduced when the motor is to have a hoisting torque. In this way, a highly desirable feature of operation is achieved in a simple manner by operation of a single contactor.

The apparatus including the above-described features has been found to operate precisely and to lend itself to precise control of speed and torque over a wide range. To demonstrate how precisely this apparatus operates, an ordinary walnut was placed adjacent to a watch on a block directly under a weight driven by the hoist motor controlled in accordance with this invention. It was found possible to control the lowering of the weight so precisely that it cracked the walnut without touching the watch.

Figure 1B:
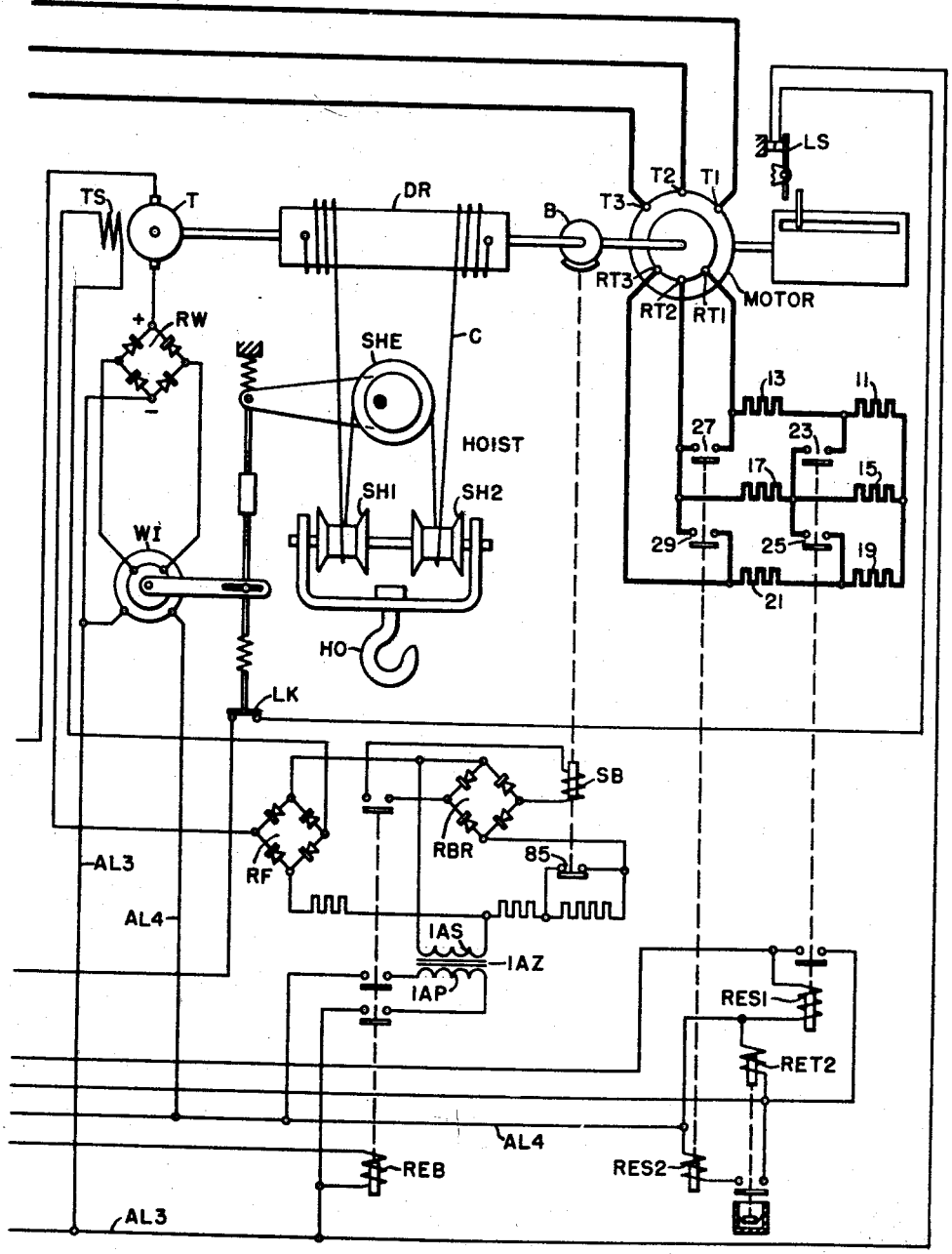
Figure 2A:
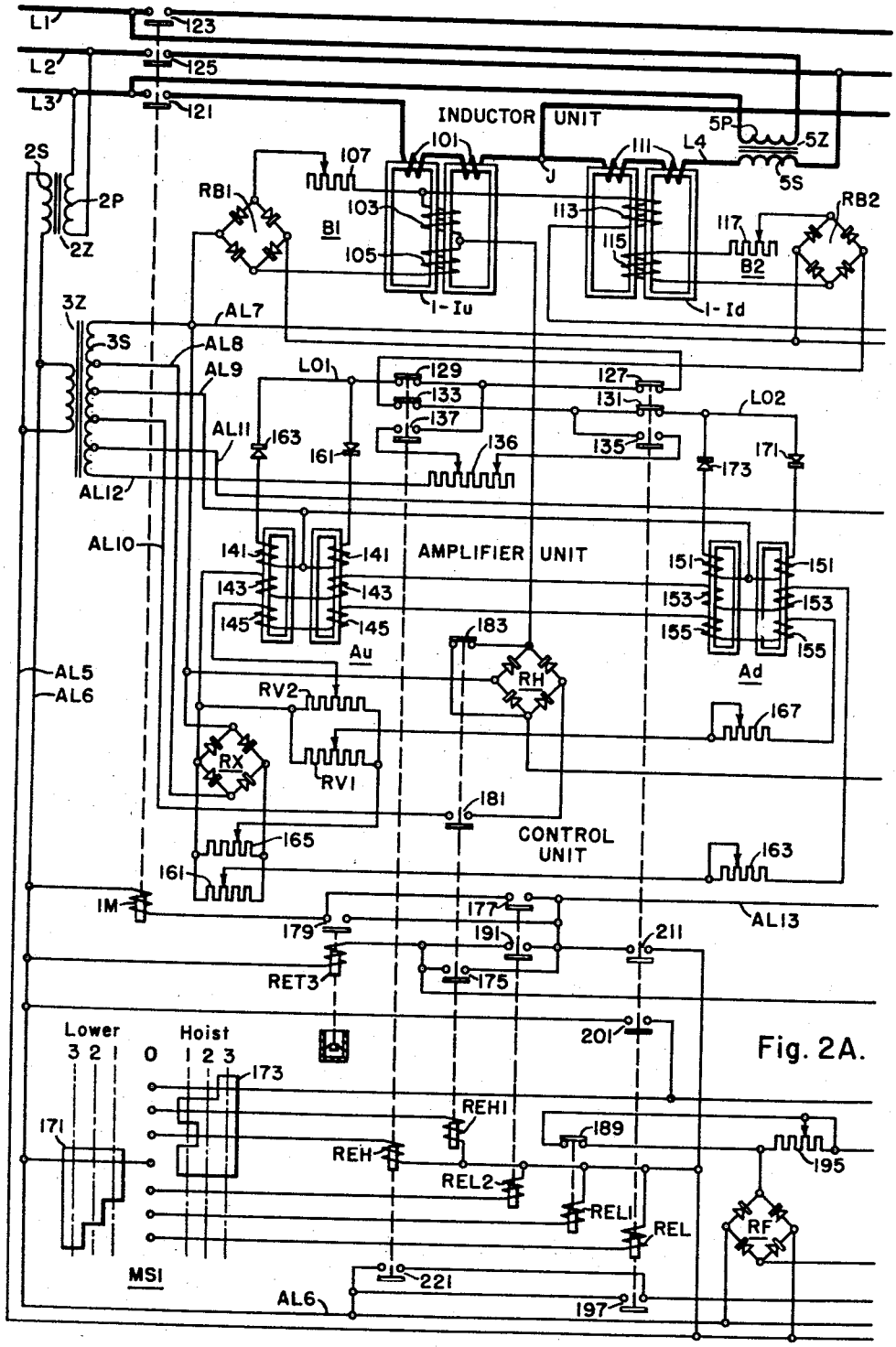
Figure 2B:
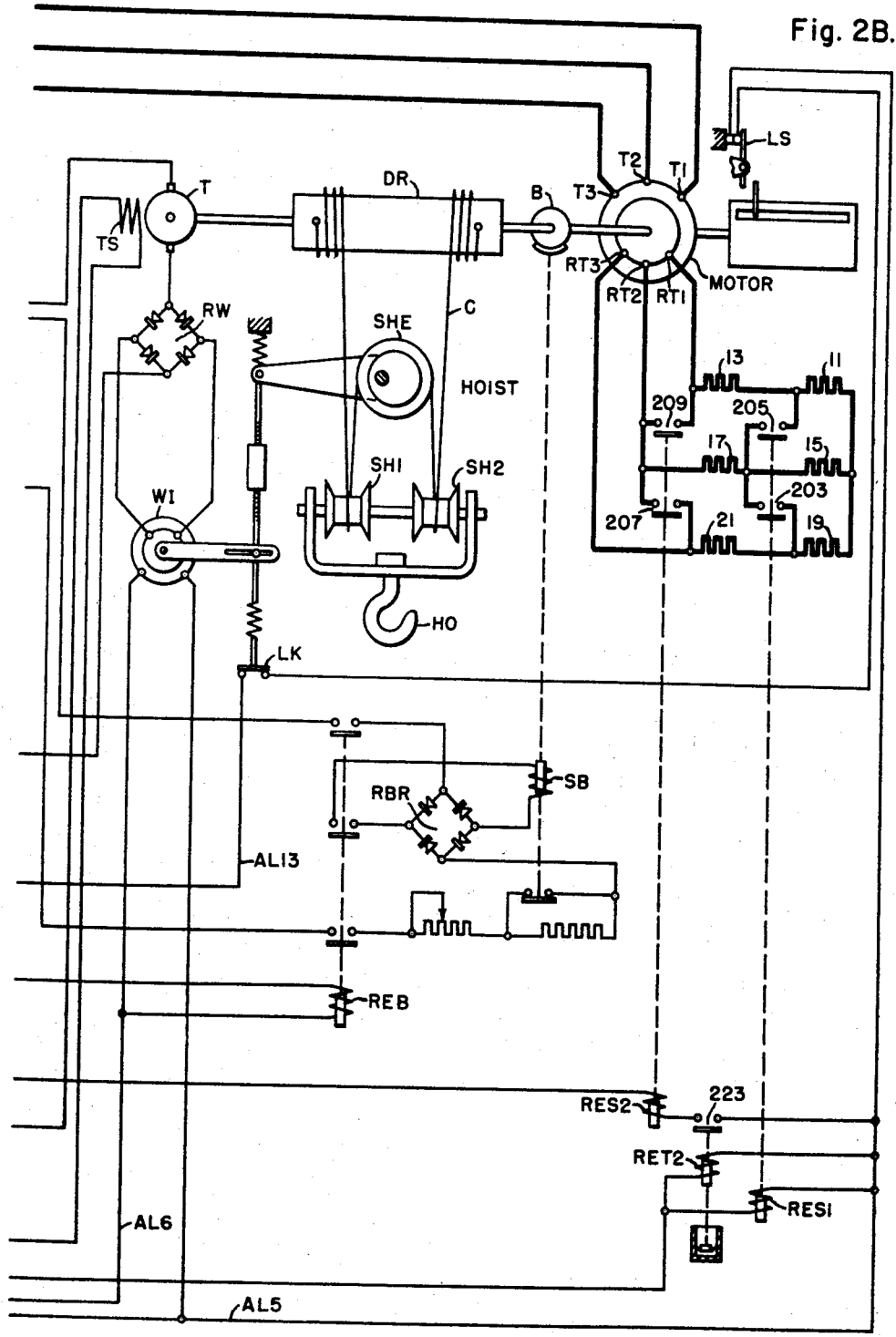
Figure 3B:
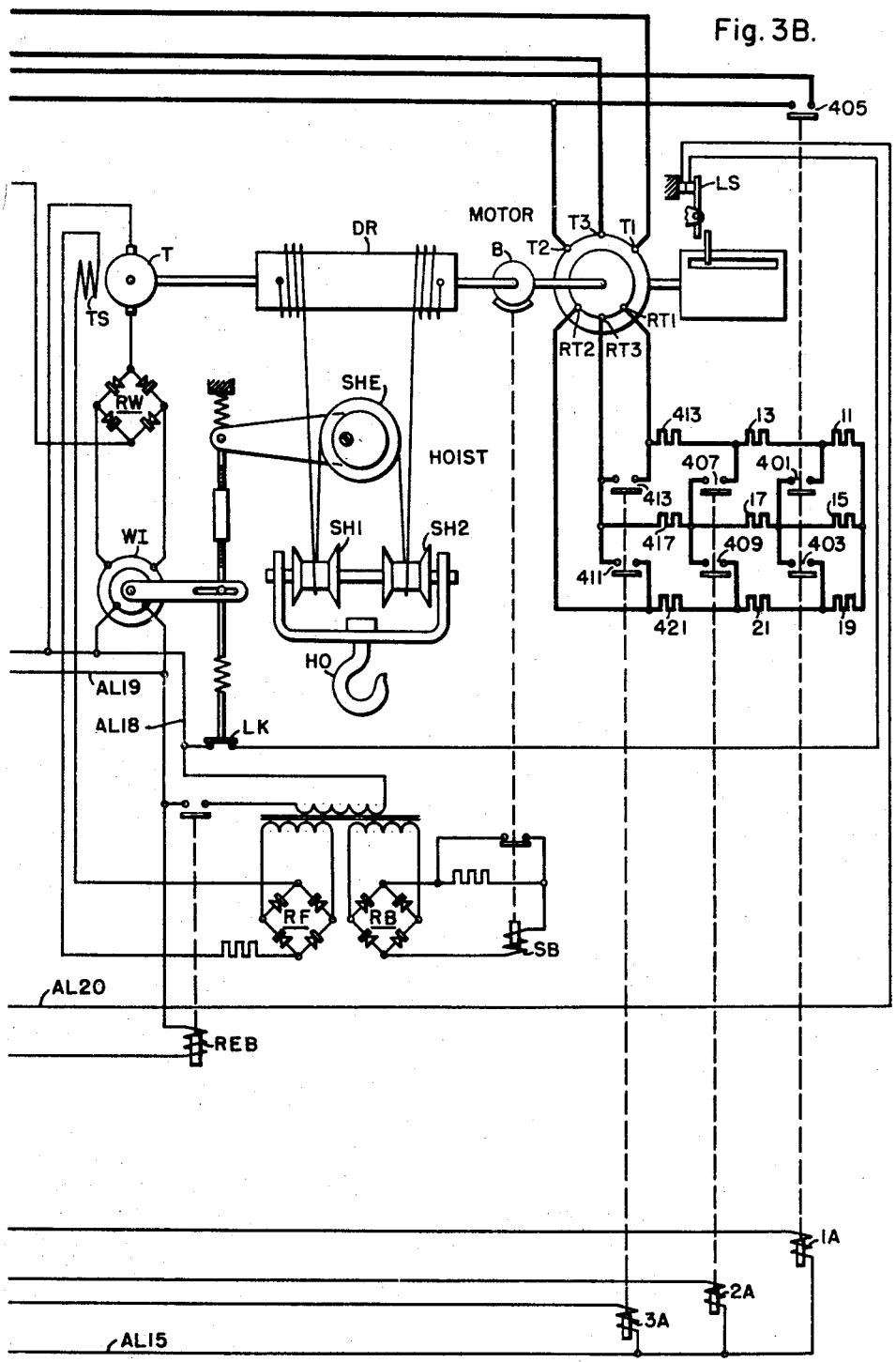
Figure 4:
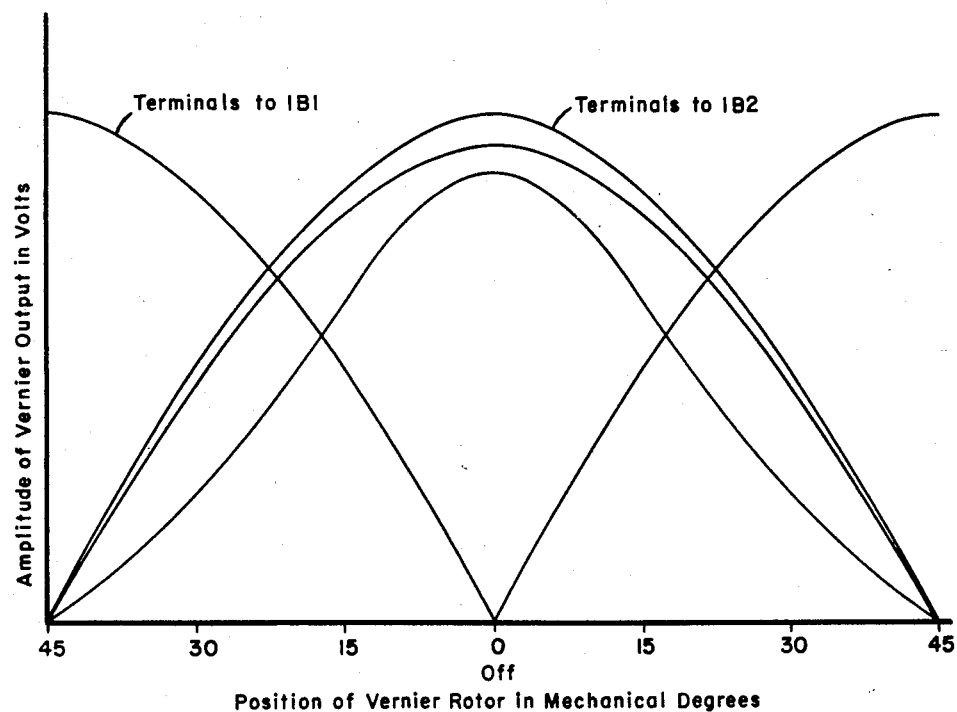

The novel features considered characteristic of this invention are disclosed generally above. This invention, both as to its organization and its method of operation together with additional objects and advantages thereof, will be understood from the following description of specific embodiments read in connection with the accompanying drawings, in which:

Figures 1A and 1B constitute a circuit diagram of one embodiment of this invention;

Figs. 2A and 2B constitute a circuit diagram of a modification of this invention;

Figs. 3A and 3B constitute a circuit diagram of a further embodiment of this invention; and Fig. 4 is a graph illustrating the operation of a vernier in accordance with this invention.

*Description—Figs. 1A–1B*

The apparatus shown in Figs. 1A and 1B includes a Motor, a Hoist, an Inductor Unit and a Control Unit. This apparatus is supplied from the conductors L1, L2 and L3 which may be the phase conductors of a commercial three-phase supply and the conductor L4, which derives its power through the secondary 1S1 of transformer 1Z. The conductors L1, L2, L3 and L4 constitute a duplex interconnected three-phase source. For control purposes, there are, in addition, the conductors AL1 and AL2 which derive their power from the secondary 1S2 of the transformer 1Z, and the conductors AL3 and AL4 which derive their power from the secondary 1S3.

The Motor includes a field winding having terminals T1, T2, T3 and a rotor preferably of the wound type having terminals RT1, RT2, RT3. The rotor terminals RT1, RT2, RT3 are interconnected by pairs of resistors 11, 13, 15, 17, 19, 21, one set 11, 15, 19 of which may be shunted out by the contacts 23 and 25 of relay RES1 and the other set 13, 17, 21 by the contacts 27 and 29 of relay RES2. Relays RES1 and RES2 are in the Control Unit. The Motor also includes a brake B which may be released by operation of a solenoid SB. Further, the Motor includes a limit switch mechanism including the limit switch LS which is opened when the Hoist reaches its upper limit.

The Hoist is of the type disclosed in the parent application. It includes a hoist drum DR which is connected to a hook HO through a cable C, a pair of sheaves SH1 and SH2 and an equalizer sheave SHE. The drum DR is rotatable by the Motor and drives a tachometer T which has a field winding TS and produces a potential proportional to the speed of the drum DR. The field winding TS derives its power from the conductors AL3 and AL4 through a rectifier RF supplied from a transformer 1AZ. The Hoist is connected through the equalizer sheave SHE to a weight inductor WI in the manner disclosed in the above-identified parent application and in an article on page 56 of Westinghouse Engineer for March 1952. The secondary of the inductor WI is connected to a rectifier RW which supplies a potential proportional to the load on the hook.

The Inductor Unit includes a pair of inductors I$d$ and I$u$. Inductor I$d$ has output winding 31, a bias winding 33 and an input winding 35. The inductor I$u$ has output winding 41 and an input winding 45. The inductors I$d$ and I$u$ are of the saturable type, the saturation being determined by the magnitude of the current through the biasing winding 33 and the input windings 35 and 45 and the impedance of the inductors I$d$ and I$u$ depending on the magnitude of the saturation. Such inductors are available in the art with additional windings for biasing or other purposes. The use of inductors, including such additional windings, is within the scope of this invention, but for the purpose of this invention it is only esential that the inductors have the winding above mentioned.

The output windings of inductors I$d$ and I$u$ are connected through the contacts 51 and 53 of a contactor M in series between conductors L2 and L4 which are at opposite phase potentials. The junction J of these output windings is connected to the terminal T2 of the motor. The terminals T1 and T3 of the motor are respectively connected to the conductors L1 and L3 through additional contacts 55 and 57 of the contactor M. With the Motor so connected, its lowering torque increases as the impedance of inductor I$d$ is reduced and its hoisting torque increases as the impedance of I$u$ is reduced.

The Control Unit controls the supply of current to the input windings 35 and 45 of the inductors I$d$ and I$u$ and also the operation of the Motor and the resistance in its rotor circuit. Among the principal components included in the Control Unit are a rectifier RB for supplying the bias to the inductor I$d$, a vernier unit V, a rectifier RH for supplying current to the input winding 45 of inductor I$u$ when the hoisting torque of the motor is to be boosted, the rectifier RW and a rectifier RBR for supplying the braking solenoid SB. In addition, there are the main line contactor M, the time delay relay RET1 through which the contactor M is locked in once the operation is started, the relay REB controlling the braking solenoid SB and the current for the winding TS, and the already mentioned relays RES1, RES2 and RET2. The interconnection of the above-mentioned control components with the Inductor Unit and the Motor is controlled by a master switch MS which has three hoist positions labeled 1, 2, 3, three lower positions labeled 1, 2, 3, and a central standby position labeled 0. The relay RET1 is of the type that pulls in immediately on energization and drops out on deenergization after a time delay. Thus, the master switch MS can be moved from hoist to lower through 0 or vice versa while the relay RET1 remains actuated.

The rectifier RB is supplied from the conductors AL1 and AL2 through a contact 61 of the switch MS and a variable resistor R1V which controls the magnitude of the bias. With the switch MS set in the 0 position, in lower position 1, or in any hoist position, the maximum resistance from the variable resistor R1V is connected in series with the rectifier RB. With the switch in lower position 2 this resistance is reduced to a predetermined magnitude, with the switch in lower position 3, the resistance is further reduced. The rectifier RB supplies current to the bias winding of the inductor I$d$ to reduce its impedance. This current is supplied with the apparatus in standby condition. Thus, in this condition the impedance of the inductor I$d$ is reduced by the biasing winding so that in the absence of current through the input winding 45 of the inductor Iu or through the input winding 35 of inductor Id, the potential which would be supplied to the Motor if the contactor M were closed is such as to cause the Motor to produce a down torque.

The vernier V includes a vernier inductor VI and a rectifier RV. The vernier inductor VI is similar to an induction regulator and may be made up from a standard repulsion-start induction-run motor differing from such a motor in which the commutator and brush rigging are omitted. The rotor may be provided with a handle for setting the inductor VI. The stator windings of the inductor are supplied from the conductors AL3 and AL4. The rotor windings supply the rectifier RV. The rectifier RV is connected to contacts 63 and 65 of switch MS to supply the input windings 35 and 45 of the inductors Id and Iu in position 0, hoist position 1 and any lower position in a circuit extending from the positive terminal of the rectifier RV, the contact 63 of the switch MS, the input winding 35, the other contact 65 of the switch MS, the rectifier RH, the input winding 45 to the negative terminal of the rectifier. This is an independent circuit including substantially only the vernier supply. When the rectifier RV is energized current is thus supplied to the input windings from the vernier rectifier RV. The current thus supplied to the input winding 35 of the inductor Id is such as to counteract the current supplied through the bias winding and reduce the down torque. The effect of the current through the input winding 45 of inductor Iu is such as to decrease the impedance of the inductor Iu and increase the up torque. The displacement of the handle on the rotor of inductor VI in either direction increases the current supplied by the rectifier RV. Thus, the effect of any displacement is to increase the up torque and decrease the down torque.

The hoist boosting rectifier RH is adapted to be supplied from the conductors AL1 and AL2 through a contact 67 of the switch MS and a variable resistor R2V in hoist positions 1, 2, 3. In hoist position 1 the resistor R2V is at a maximum and in positions 2 and 3 the resistance R2V is reduced. In 0 position, any lower position or hoist position 1 the rectifier RW, the tachometer T and the rectifier RH are connected in a circuit with the input windings which is separate from that of the vernier V and which extends from the positive terminal of the rectifier RW through the tachometer T, the input winding 35 of inductor Id, the contact 65 of switch MS, the rectifier RH, the input winding 45 of inductor Iu, a part of conductor AL3 to the negative terminal of rectifier RW. This circuit including the rectifier RW and the tachometer T has a high resistance compared to the circuit RV, 63, 35, 65, RH, 45, RV which includes the vernier rectifier. In this circuit the rectifier RH does not supply current unless it is energized, that is, unless the master switch is in hoist position 1, 2 or 3. The current which is supplied when the master switch is in positions 1, 2 and 3 decreases the impedance of the inductor Iu and increases the impedance of inductor Id, thus increasing the up torque of the motor and decreasing its down torque. In the preferred practice of this invention the potential supplied by the tachometer T is small compared to the potential supplied by the weight rectifier RW. The potential of the weight rectifier RW is such as to decrease the impedance of the inductor Iu, that is, increase the up torque and increase the impedance of the inductor Id, that is, decrease the down torque. The potential applied by the tachometer T enhances or reduces the potential supplied by the rectifier RW depending on the direction of rotation of the hoist drum. When the rotation is in the lowering direction the potential supplied by the rectifier RW is enhanced, that is, the up torque is increased and the down torque decreased, and when the direction of rotation of the Motor is in the raising direction the output of the rectifier RW is reduced by the tachometer T, that is, the up torque is reduced. Thus, the tachometer T functions to reduce the speed of the load regardless of the direction in which it is moving.

In hoist positions 2 and 3 the rectifier RH is connected directly to the input winding 45. In hoist positions 1, 2, 3 and lower positions 1 and 2 the coil of contactor M is adapted to be connected in a circuit extending from conductor AL3 through the limit switch LS, load limit switch LK, contacts 69 or 71 of the master switch MS, the coil of contactor M to conductor AL4. The coil of contactor M is also adapted to be connected in a circuit extending from conductor AL3 through the limit switches LS and LK, the normally open contact 73 of relay RET1, the coil to conductor AL4. Thus, the contactor M is closed when the time delay relay RET1 is energized. The coil of time delay relay RET1 is adapted to be connected in a circuit extending from conductor AL3, through the limit switches LS and LK, the contacts 69 or 71 of the master switch MS, the coil to conductor AL4. The coil of relay RET1 is also held in through its contact 73 in lower position 3 and thus maintains the contactor M actuated in lower position 3. This connection prevents the power supply to the Motor from being interrupted for a predetermined time interval after the brake is applied when the switch MS is set to deenergize the Motor. Also when the master switch MS is moved through 0 from hoist to lower or vice versa, relay RET1 prevents contactor M from dropping out.

*Stand-by—Figs. 1A–1B*

In the stand-by condition of the apparatus, the conductors L1, L2, L3 are energized from the commercial supply through the usual disconnects or circuit breakers (not shown). Since conductors L1 and L2 are energized, transformer 1Z is supplied with potential and conductor L4 is energized. Conductors AL1, AL2, AL3, and AL4 are also energized.

In the stand-by condition, the switch MS is at the 0 setting. In this setting the rectifier RB is energized and bias is supplied to the inductor Id which reduces its impedance. The hoist boosting rectifier RH is deenergized. The rectifier RV is energized and is connected to the input windings 35 and 45 of the inductors Id and Iu and supplies potential to these input windings which would tend to increase the impedance of inductor Id and decrease the impedance of inductor Iu. The vernier RV may be initially set so as to produce the desired initial torque. Usually this setting is made on the assumption that there will be initially no load on the hook, and under such circumstances, the vernier inductor VI is set to produce 30 to 50% down torque.

The weight responsive rectifier RW and the tachometer T are connected in a circuit with the input windings 35 and 45 of the inductors Id and Iu through the contact 65. With the Motor at rest the tachometer potential T is zero. With no load on the hook HO the output of the rectifier RW is substantially zero and substantially no current flows in this circuit. With load on the hook the potential output of the rectifier RW is substantial, depending on the load and current flows in this circuit. This current is of such polarity as to tend to increase the impedance of inductor Id and decrease the impedance of inductor Iu.

Relay RET1 is deenergized, as is also contactor M. The contacts of contactor M are then open and conductors L1, L2, L3 and L4 are disconnected from the output windings of the inductors Id and Iu. In addition, at another normally open contact 81 of contactor M and at the switch MS the circuit through the coil of the braking relay REB is open. At the switch MS the circuits through the exciting coils of the relays RES1, RES2, and RET2 are open so that these relays are deenergized and full resistance 11 through 21 is connected in the rotor circuit.

Operation—Figs. 1A–1B

In describing the operation, it will first be assumed that there is no load on the hook H and that it is desired to lower the hook. Under such circumstances, the switch MS is moved to lower position 1. In this position the circuit through the exciting coil of the contactor M is closed at contact 69. Contactor M is then actuated and at its main contacts connects the inductors $Id$ and $Iu$ to the conductors L1, L2, L3 and L4. In addition, with the switch MS in lower position 1, a circuit is closed through the exciting coil of relay REB through the contact 83 of switch MS and the contact 81. Transformer 1AZ is then energized from conductors AL3 and AL4, the circuit is closed through rectifier RBR and the solenoid SB is energized, releasing brake B. In addition, the resistance in circuit with the supply to rectifier RBR is increased by the opening of a contact 85 of solenoid SB. Further, rectifier RF is energized and current is supplied to the field TS of the tachometer T. Current is also supplied to the exciting coil of relay RET1 through the contact 69 of the switch MS and relay RET1 is actuated at once, closing a lock-in circuit through contact 73 for the contactor M which permits contactor M to remain energized in lower position 3 of the switch MS and after the switch MS is reverted to its standby position. This prevents the deenergization of the Motor before the brake B is reengaged, so that when the deenergization of the Motor starts, electrical (torque) braking as well as mechanical braking is applied.

The output windings of the inductors $Id$ and $Iu$ are now connected in circuit with the motor. At this time, the rectifiers RB and RV are supplying current to the input windings 33, 35 and 45 of the inductors $Id$ and $Iu$. Since there is no load on the hook the current supplied by the rectifier RW is substantially zero; the tachometer potential is also zero. As a rule the potential of rectifiers RB and RV is such that a lowering torque of about 30 to 50% of rated torque is available. The motor then rotates in the lowering direction, lowering the hook. As the motor rotates, potential appears at the terminals of the tachometer T. This potential is of such polarity as to decrease the lowering torque and increase the up torque. The speed of the hook is stabilized at about 30 to 40% rated speed.

If it is desired that the hook HO be lowered at a higher speed, the switch MS may be moved to lower position 2. In this position a portion of the resistance R1V in circuit with the rectifier RB is shunted out, decreasing the impedance of the down inductor $Id$ and increasing the down torque. Still higher down speed may be obtained in lower position 3 where additional resistance in series with the rectifier RB is shunted out and the output of the rectifier further increased. In lower position 3 a circuit is also closed through the exciting coil of relay RET2 by contact 87 of the switch MS. This circuit extends through the contact 73 of relay RET1, the contacts 69 and 87 of the switch MS, the exciting coil of relay RET2 to conductor AL4. After a predetermined time interval, relay RET2 is actuated, closing a circuit through relay RES2 which shunts out the resistance 11 through 21 in the rotor circuit of the Motor. The Motor is thus, at this point, driven in the lowering direction at the maximum speed.

Now assume that a load is being lowered. In lower position 1 the rectifier RW now supplies potential dependent upon the magnitude of the load. This potential is of such polarity as to decrease the impedance of the hoist inductor $Iu$ and increase the impedance of the lower inductor $Id$, correspondingly increasing the up torque relative to the down torque. The torque available may thus be adjusted to the load. The inductor VI and the rectifier RV permit vernier changes in the torque so that the highest precision is attainable. Because the rectifier RV is connected in a circuit independently of the load rectifier RW and the tachometer T, the vernier has the optimum effect and even if its components VI and RV are small it is highly effective.

The operative in lower positions 2 and 3 is the same with load on the hook HO as with no load on the hook, except that the rectifier RW governs the magnitude and polarity of the speed and torque supplied by the Motor. If the load is very heavy and would tend to overhaul the motor at a high speed, the effect of the rectifier RW is to produce a net up torque in the Motor. The magnitude of this net up torque may be precisely controlled by the vernier VI. As is explained in the parent application, an excessive load would open the load limit contact LK and this would cause the contactor M to be deenergized. The brake would then be applied to the Motor and the Motor while braked would tend to coast to zero speed. Under such circumstances, the dynamic braking effect of the Motor and of the tachometer T would prevent the load from being lowered at too high a speed.

Now assume that there is no load on the hook HO and the hook is to be hoisted. Under such circumstances, the switch MS is moved to hoist position 1. In this position, the potential supplied to rectifier RB is unchanged but the hoist booster rectifier RH is energized through the resistor R2V and the associated contact 67 of the switch MS. The potential supplied by the rectifier RV remains unchanged and the rectifier RW and the tachometer T remain connected as described. The contactor M and the relay RET1 are actuated through the contact 71 of switch MS and the relay REB through the contact 91 of switch MS.

Power is then supplied to the Inductor Unit, the brake B is disengaged and power is supplied to the field TS of the tachometer T. At this point, the potential supplied by the rectifier RW and the tachometer T is substantially zero.

The input windings 35 and 45 of the inductors $Id$ and $Iu$ are now then supplied in the same manner as with the switch MS set for lowering, except that current is supplied by the rectifier RH. This has the effect of increasing the hoisting torque and decreasing the lowering torque to a point at which the hook is hoisted. In this case, the tachometer T supplies a potential tending to reduce the up torque and increase the down torque. The effect of the combination of potentials impressed in this case is such that the hook is hoisted at a speed of 30 to 40% rated speed.

If higher hoisting speeds are desired, the switch MS is moved to hoist positions 2 and 3 in succession. In positions 2 and 3, the resistance R2V in series with the rectifier RH is reduced. In addition, in positions 2 and 3 the rectifiers RV, RW and the tachometer T are disconnected from the input windings of the inductors $Id$ and $Iu$ and the rectifier RH remains connected only to the input winding 45 of the inductor $Iu$. The up torque is now substantially increased and the hook moves at a higher speed. In hoist position 3, relay RES1 is first actuated through contact 71 of switch MS shunting out a portion of the resistance (11, 15, 19) in the rotor circuit. In addition, relay RET2 is actuated, and after a predetermined time interval relay RES2 is actuated and the remainder of the resistance (13, 17, 21) in the rotor circuit is shunted out. The hook is then raised at the maximum speed.

The operation with weight on the hook is similar, except that in hoist position 1 the output of rectifier RW sets the up torque in dependence upon weight on the hook and the vernier VI may then be adjusted to yield precisely the desired up torque.

*Description—Figs. 2A–2B*

The apparatus shown in Figs. 2A and 2B includes a Motor, a Hoist, an Inductor Unit, an Amplifier Unit and a Control Unit. This apparatus is supplied with power from the duplex interconnected three-phase source including the conductors L1, L2, L3 and L4, conductor L4 being supplied from the secondary 5S of transformer 5Z. The primary 5P of transformer 5Z is connected between conductors L1 and L3. In addition, potential for the auxiliary components is supplied from the conductors AL5 and AL6 supplied through the transformer 2Z, the primary 2P of which is connected to the conductors L2 and L3 so that the conductors AL5 and AL6 are energized independently of the position of the contactor 1M which controls the connection of the conductors L1, L2, L3 and L4 to the Motor. Further, there are auxiliary conductors AL7, AL8, AL9, AL10, AL11 and AL12 which are supplied from the secondary 3S of the transformer 3Z through the transformer 2Z. The difference of potential between the conductor AL7 and the other of these conductors increases progressively as the ordinal following the L increases. An additional conductor is the conductor AL13 which is, in effect, a supply conductor since it is connected to the conductor AL5 through the limit switches LS and LK. It is believed convenient for the purpose of tracing the circuits to regard AL13 rather than AL5 as a supply conductor.

The Motor and Hoist are similar to the corresponding components of the apparatus shown in Figs. 1A and 1B.

The Inductor Unit includes the inductors 1–Iu and 1–Id. The inductor 1–Iu has output windings 101 and input windings 103 and 105. The input windings are connected in series across a biasing network B1 which includes a rectifier RB1 and a variable resistor 107. The inductor 1–Id has output windings 111 and input windings 113 and 115. A biasing network B2 including a rectifier RB2 and a variable resistor 117 is connected across one of these input windings 115. The output windings 101 and 111 of the inductors 1–Iu and 1–Id are connected in series between the conductors L3 and L4 which are at opposite phase potentials through a contact 121 of contactor 1M. The junction J of these output windings is connected to the terminal T3 of the Motor. The terminals T1 and T2 are connected respectively to the conductors L1 and L2 through the remaining contacts 123 and 125 of the contactor 1M.

The biasing networks B1 and B2 are energized from the Amplifier Unit. One input terminal of each of the networks is connected to the conductor AL7. The other terminal of the network B1 is connected to the output conductor LO1 of the Amplifier Unit through normally closed contacts 127 and 129 of relays REH and REL. The other terminal of the network B2 is similarly connected to output conductor LO2 of the Amplifier Unit through other normally closed contacts 131 and 133 of the same relays. The last mentioned terminal of network B2 is further adapted to be connected through the normally closed contact 133 of relay REH, normally open contact 135 of relay REL and a variable resistor 136 to conductor AL12. The corresponding terminal of network B1 is similarly adapted to be connected through normally closed contact 127 of relay REL, a normally open contact 137 of relay REH and the resistor to conductor AL12. It is seen that when relay REH is actuated the input windings 103 and 105 of amplifier 1–Iu are supplied with current independently of the Amplifier Unit which may be substantially higher than the current supplied through the Amplifier Unit and when relay REL is actuated the input winding 115 of amplifier 1–Id is supplied with current independently of the Amplifier Unit which may be substantially higher than the current supplied through the Amplifier Unit but is usually lower than the current supplied to the input winding of the inductor 1–Iu.

The Amplifier Unit includes a pair of magnetic amplifiers Au and Ad. Each of these amplifiers has output winding 141 and 151, bias windings 143 and 153 and vernier windings 145 and 155. Each set of output windings has an intermediate terminal which is connected to the conductor AL9. The other terminals of each set of output windings are connected to conductors LO1 and LO2, respectively through rectifiers 161 and 163 and 171 and 173, one 161 or 171 poled to conduct positive current from the conductors LO1 or LO2 to the winding 141 or 151, and the other 163 or 173 from the winding 141 or 151 to LO1 or LO2 in each case.

The bias windings are supplied in series from a rectifier RX in a circuit extending from the positive terminal of the rectifier through a voltage divider 161, a variable resistor 163, the bias windings 153 and 143 of the amplifiers Ad and Au to the negative terminal. The vernier windings 145 and 155 are similarly supplied from the rectifier RX in a circuit extending from the positive terminal of the rectifier through another divider 165, a variable resistor RV1, a further variable resistor 167, the vernier windings, still another variable resistor RV2 to the negative terminal of the rectifier. The rectifier is supplied from the conductors AL7 and AL8. The variable resistors RV1 and RV2 in circuit with the vernier windings are used to set the vernier current which is supplied through the amplifiers Au and Ad to the input windings 103 and 105 and 115 of the inductors 1–Iu and 1–Id. The vernier windings 155 of amplifier Ad are so related to the other windings of this amplifier that an increase in the current flowing in this winding (155) increases the output current of the amplifier Ad; the vernier windings 145 of the amplifier Au are so related to the other windings that an increase in the current flowing through this vernier winding decreases the output of amplifier Au.

The Control Unit includes the master switch MS1, which has a standby position labeled 0 and three each hoist and lower positions labeled 1, 2, 3. The switch MS1 controls the contactor 1M and a plurality of relays including, in addition to the relays REH, REL, RES1, RES2, RET2 and REB, the relays RET3, REL1, REH1. The coils of the relays REH, REL, REH1 and REL1, REL2, RET2, RES1 and RES2 are supplied from conductors AL5 and AL6 through the selecting contacts 171 and 173 of the switch MS1. The contactor 1M and the relay RET3 are supplied from conductors AL6 and AL13 through selecting contacts 175, 177, 179 of the relays REH1, REL2 and RET3. The braking relay REB is similarly supplied from conductors AL6 and AL13.

The Control Unit also includes a rectifier RH for boosting during hoist and the weight responsive rectifier RW. The rectifier RH is supplied from conductors AL7 and AL10 through a contact 181 of relay REH1 which is normally open. In addition, the output of rectifier RH is shunted by a normally closed contact 183 of relay REH1. Rectifier RH or contact 183 is connected in series with rectifier RW and tachometer T in a circuit extending from the positive terminal of rectifier RW through rectifier RH or contact 183, one of the input windings 103 of inductor 1–Iu, the input winding 113 of inductor 1–Id, the tachometer T to the negative terminal of rectifier RW. The effect of current flow through the rectifier RH is to enhance the effect of bias network B1 and to reduce the effect of bias network B2. Thus, when current flows through rectifier RH the impedance of inductor 1–Iu is decreased and the impedance of inductor 1–Id is increased. Rectifier RH then tends to increase hoist torque and decrease lowering torque.

Rectifier RW has a similar effect, that is, the greater the load the more rectifier RW tends to increase the hoist torque and decrease the lowering torque. The output of rectifier RW is large compared with the output of tachometer T. The output of the latter, as indicated in Fig. 2B, tends to enhance the effect of rectifier RW when the hoist drum DR is rotating in the lowering direction and to reduce the effect of rectifier RW when the hoist drum is rotated in the hoisting direction.

*Stand-by—Figs. 2A–2B*

In the stand-by condition of the apparatus, conductors L1, L2, L3 and L4 are energized. Conductors AL5 through AL13 are then energized, the latter so long as limit switches LS and LK are closed. Amplifiers A$u$ and A$d$ are then supplied with potential and networks B1 and B2 are energized from the potential at conductors AL7 and LO1 and AL7 and LO2. Thus, the impedances of inductors 1–I$u$ and 1–I$d$ are reduced in accordance with the settings of the vernier resistors RV1 and RV2. This setting is preferably such that there is 30 to 50% lowering torque with no load on the hook HO.

The switch MS1 is the zero position and relay REH1 is deenergized so that there is no potential impressed through rectifier RH. Assuming that in stand-by there is no load on the hook, the potential impressed from rectifier RW is substantially zero and the hoist drum being at rest the potential from tachometer T is zero. Thus, the inductors 1–I$u$ and 1–I$d$ remain set so that if they were energized the lowering torque would be from 30 to 50%.

With the switch MS1 in the zero position, relays REH, REH1, REL, REL1, REL2, RES, RES1, RES2, RET2 are deenergized. Contactor 1M, relay RET3 and relay REB are then deenergized. The brake B is then applied to the Motor and the resistance in the rotor circuit of the motor is at a maximum. If at this time a load were applied to the hook HO, the tendency of the Motor to overhaul the load would be suppressed by the brake B.

At this time the field winding TS is energized from the rectifier RF. The field is at a maximum since contact 189 of relay REL1 is closed.

*Operation—Figs. 2A–2B*

Assume first that a lowering operation with no load on the hook is to be carried out. Under such circumstances, the switch MS1 is moved to lower position 1 and relay REL2 is energized and at its now closed contact 177 supplies current from conductors AL13 and AL6 to energize contactor 1M. The latter closes its contacts 121, 123, 125, supplying power to the Motor. In addition, at another now closed contact 191 of relay REL2, relay RET3 (analogous to RET1 of Figs. 1A–1B) is energized closing its contact 179 to lock in the motor independently of relay REL2. At this point, current is supplied to the input windings 103 and 105 and 115 of the inductors from the amplifiers A$u$ and A$d$ to produce 30 to 50% lowering torque. The output of the tachometer T tends to decrease this lowering torque so that the operation of the motor is stabilized at about 30 to 40% rated speed.

If higher speed is now desired, the switch MS1 is moved to lower position 2, energizing relay REL1. The normally closed contact 189 which shunts out resistance 195 in the circuit of field TS is now opened and the excitation of the field is reduced so that the potential of tachometer T is reduced. The balancing potential of the tachometer is then reduced so that the lower torque is increased and the speed of the Motor is correspondingly increased.

A further speed increase is achieved by moving the switch MS1 to lower position 3. In this case, relay REL is actuated. This relay, at its contact 127, disconnects the supply to bias network B1 and connects bias network B2 to be supplied between terminals AL7 and AL12 through the variable resistor 136. In this way, the down torque is substantially increased. In addition, relays RES1 and RET2 are actuated through now closed contact 197 of relay REL and after relay RET2 times out relay RES2 is actuated through another contact 201 of relay REL. At contacts 203, 205, 207, 209, the resistances 11, 15, 19 and 13, 17, 21 in the rotor circuit are shunted out in succession. Further, at a further contact 211 of relay REL the contactor 1M is locked in through the now closed contact 179 of relay RET3. The hook HO is now lowered at the maximum speed.

If there is a load on the hook HO the rectifier RW supplies potential in each of the lower positions of the switch MS1 and this potential tends to reduce the lowering torque and increase the hoisting torque if there is a tendency to overhaul. In lower positions 1 and 2 the torque may be adjusted to the precise magnitude desired by setting the resistors RV1 and RV2 in series with the vernier windings 145 and 155 of the amplifiers A$u$ and A$d$.

Now assume that the hook HO with no load on it is to be raised. In this case, switch MS1 is moved to hoist position 1. Relay REH1 is then actuated. This relay at its lower now closed contact 175 closes an energizing circuit for relays RET3 and REB. When relay REB is actuated, the brake B is released. When relay RET3 is actuated, it closes the contact 179, actuating contactor 1M. Power is now supplied through the conductors L1, L2, L3 and L4 to the Motor.

At another now closed contact 181 of relay REH1 the rectifier RH is energized; in addition, the shunting contact 183 across the rectifier is opened. The rectifier RH now supplies current through the input windings 103 and 113 of inductors 1–I$u$ and 1–I$d$, tending to increase the hoisting torque and decrease the lowering torque. The increase is sufficient to cause the motor to raise the hook. As the motor raises the hook, a counteracting potential is supplied from the tachometer T. This potential causes the speed at which the hook is raised to stabilize at about 30 to 40% rated speed.

If higher speed is desired, the switch MS1 is set in hoist position 2. In this case, relay REH is actuated. This relay, at its upper contact 133, disconnects the input winding 115 of inductor 1–I$d$ from the amplifier A$d$ and connects the input windings 103 and 105 of inductor 1–I$u$ between conductors AL7 and AL12 through the variable resistor 136. The impedance of inductor 1–I$u$ is now substantially reduced and the Motor supplies increased hoisting torque. In addition, the lower normally open contact 221 of relay REH is closed, energizing relay RES1. The latter is actuated, shunting out a portion of the resistance (11, 15, 19) in the rotor circuit. In addition, relay RET2 is energized and it prepares a circuit through contact 223 for relay RES2. If still higher speed is desired, the switch MS1 is moved to hoist position 3. At this point, relay RES2 is energized through the contact 223 of relay RET2, further reducing the resistance in the circuit of the rotor and thus increasing the hoist torque to a maximum.

When there is load on the hook, the hoist torque is further increased by the potential supplied from the rectifier RW which is supplied in series with RH.

*Description—Figs. 3A–3B*

The apparatus shown in Figs. 3A and 3B includes a Motor, a Hoist, an Inductor Unit, a Vernier Unit and a Control Unit. This apparatus is supplied from conductors L1, L2, L3 and L4 connected in a duplex interconnected three-phase system with transformer 4Z. The conductors L1, L2, L3 and L4 are energized through suitable disconnects S1, S2, S3. Potential for the auxiliary components is supplied from conductors AL14 and AL15, which are connected to the conductors L1 and L2 through a control switch SW1, and through auxiliary conductors AL16, AL17, AL18, AL19, which are supplied from secondaries 5S1 and 5S2 of transformer 5Z. For convenience, the conductor AL20 may also be considered as a supply conductor. This conductor is connected to supply conductor AL18 through the overload and up limit switches LK and LS.

The Motor and the Hoist are similar to the corresponding components in the apparatus shown in Figs. 1A and 1B, 2A and 2B. The Inductor Unit is similar to the Inductor Unit in the apparatus shown in Figs. 2A and 2B including inductors 1–Iu and 1–Id with input and output windings 103, 105, 113, 115, and 101 and 111 similar to those of the latter. The input windings 103 and 105 of the inductors 1–Iu and the winding 115 of 1–Id are supplied from biasing networks 1B1 and 1B2. These networks include rectifiers 1RB1 and 1RB2 supplied from the Vernier Unit.

The output windings 101 and 111 are connected in series between opposite phase potential conductors L2 and L4 through contacts 301 of contactor 2M. Terminal T2 of the Motor is connected to the junction J of the windings 101 and 111. The other terminals T1 and T3 of the Motor are connected to conductors L1 and L3 through contacts 303 and 305 of contactor 2M.

The Vernier Unit includes a vernier inductor 1VI, which in practice is a repulsion-start induction-run motor, with the commutator and brush rigging omitted and the rotor winding insulated into two separate sections 311 and 313 spaced electrically by 90°, that is, the inductor has two sections, the potential output of which is in quadrature. The stator of the vernier inductor 1VI is connected to the conductors AL14 and AL15. One of the rotor sections 311 is connected to supply the network 1B1 through normally closed contacts 321 of the relay L in the Control Unit. The other rotor section 313 is connected to supply the network 1B2 through another normally closed contact 323 of the relay L, a normally closed contact 325 of the relay H of the control unit, and a variable resistor 327. The network 1B2 is also adapted to be supplied from conductors AL16 and AL17 through a normally open contact 331 of relay L, contact 325 of relay H, and a variable resistor 333, a portion of the resistance of which may be shunted out by a normally open contact 335 of relay H. It is seen that with relay L actuated, network 1B1 is not energized and network 1B2 is energized from conductors AL16 and AL17. Under such circumstances, the down torque of the motor prevails in the absence of any additional supply to the input windings 103, 105 and 113 of the inductors 1–Iu and 1–Id. With relay H actuated, network 1B2 is not energized and network 1B1 is energized from winding 311 of the inductor 1VI.

The relationship between the amplitude of the output of the two windings 311 and 313 of the inductor 1VI and the mechanical displacement of the rotor in degrees is shown in Fig. 4 in which the amplitude of the voltage impressed is plotted vertically and the mechanical displacement in either direction from the central setting is plotted horizontally. The potential of the winding 313 impressed on 1B2 is seen to be in quadrature with the potential impressed on 1B1. The three curves shown for the potential of winding 313 correspond to different loadings of the inductor 1VI. It is seen that in the absence of other potentials, the Vernier Unit with the inductor 1VI in the zero setting tends to maintain the impedance of the inductor 1–Id at a reduced magnitude. Thus, in the absence of other potentials, the Motor, if energized, produces a lowering torque.

The Control Unit includes a master switch MS2 having a position labeled zero, in which it is set in standby, five hoist positions labeled 1, 2, 3, 4, 5, and five lower positions labeled 1, 2, 3, 4, 5. The switch MS2 has a number of contacts 341, 343, 345, 347, 349, 351, 353, 355, 357. The Control Unit includes, in addition to the contactor 2M and the relays H and L, time delay relays TR, 1TR and 2TR, contactors 1A, 2A and 3A, and another reset relay MR. Relay TR is similar in function to relay RET of Figs. 1A–1B and relay RET3 of Figs. 2A–2B.

The coil of the reset relay MR is connected between conductors AL14 and AL15 through contact 353 and is thus normally actuated. When thus actuated this relay is locked in through one of its contacts 361. The coil of contactor 2M is adapted to be connected between conductors AL20 and AL19 through a contact 363 of relay MR and contacts 349 or 351 in lower positions 1, 2, 3 and all hoist positions and between conductors AL18 and AL19 through another contact 365 of relay MR and contact 347 in lower position 5. The coil of relay 2M is also adapted to be energized from conductors AL20 and AL19 through a contact 367 of time delay relay TR.

The coil of the time delay relay TR is adapted to be connected between the conductors AL18 and AL19 through contact 363 in lower positions 1, 2, 3, and all hoist positions and through contact 365 in lower position 5 and to be locked in through contact 363 and its contact 367 in all hoist and lower positions. The exciting coil of the braking relay REB is adapted to be connected between conductors AL18 and AL19 similarly to the coil of relay TR. It is to be noted that when the switch MS2 is reverted to stand-by, the brake is applied and at the same time, while relay TR still remains actuated, power is applied to the Motor.

The relay H is adapted to be connected between conductors AL14 and AL15 in hoist positions 2, 3, 4, 5 through contact 361 of relay MR which is closed in normal operation, a normally closed contact 371 of relay L and contact 353. The coil of relay L is adapted to be connected between conductors AL14 and AL15 in lower position 5 through the contact 361, contact 355 and a normally closed contact 373 of relay H. Relay 1TR is adapted to be connected between conductors AL14 and AL15 in hoist positions 3, 4, 5 and lower position 5 through the contact 361 and contacts 355 and 357. The coil of contactor 1A is adapted to be connected through the contact 361, and contacts 355 and 357 and contact 377 of relay H between conductors AL14 and AL15 in hoist positions 3, 4, 5 and lower position 5. The coil of relay 2TR is adapted to be connected between conductors AL14 and AL15 through the contact 361, contacts 355 and 357 and a contact 375 of relay 1TR in hoist positions 4 and 5 and lower position 5. The coil of contactor 2A is adapted to be similarly connected. The coil of relay 3A is adapted to be connected between conductors AL14 and AL15 through the normally open contact 379 of relay 2TR, the contact 361 and contact 357 in hoist position 5. The Control Unit also includes a hoist boosting rectifier 1RH which is energized from conductors AL16 and AL17 through resistor 333 and contact 341 in all hoist positions.

The weight responsive rectifier RW and the tachometer T are adapted to be connected to the input windings 113, 103 and 105 of the inductors 1–Id and 1–Iu through rectifier 1RH and contact 345, 383 and 385 in zero position and in hoist position 1. In the other hoist positions the rectifier 1RH is connected directly across windings 103 and 105 through a normally open contact 381 of relay H. In lower position 1 rectifier RW and the tachometer T are connected in series with input windings 103, 105 and 113 through contacts 383, 385, 343 and 345; in lower position 2 a portion of the resistance of a resistor 391 is included in this circuit; in lower position 3 more resistance is included and in lower positions 4 and 5 the whole resistor 391 is included.

Contactor 1A has a pair of contacts 401 and 403 which short out a portion of the resistances 11, 15, 19 in the rotor circuit of the Motor and an additional contact 405 which shorts out the inductor 1–Iu. When this contactor is actuated the inductor unit 1–Iu is set for maximum up torque. Contactors 2A and 3A each have contacts 407, 409 and 411, 413 in the rotor circuit of the Motor which progressively reduce the resistance 13, 17, 21, and 413, 417, 421 in the rotor circuit.

*Stand-by—Figs. 3A–3B*

In the stand-by condition of the apparatus shown in Figs. 3A and 3B, disconnects S1, S2 and S3 are closed, as is also switch SW1. The Vernier Unit is then energized. In the stand-by condition, switch MS2 is in the zero setting and the normally closed contacts 321, 323, 371, 383, 325, 373, 385 of relays L and H are closed. Current is then supplied through the biasing networks 1B1 and 1B2 as represented in Fig. 4. This current reduces the impedance of inductor 1–Id and thus would cause the Motor to deliver a down torque if it were energized. The rectifier RW and the tachometer T are also connected to the input windings 103, 105, 113 of the inductors 1–Iu and 1–Id through contact 345 and rectifier 1RH and the rectifier RW delivers a potential such that if the Motor were energized the tendency to produce down torque potentials by the Vernier Unit would be reduced in accordance with the weight on the hook HO. In addition, reset relay MR is actuated and its normally open contacts 361, 363, 365 are closed so that the circuits through the contactors 2M, 1A, 2A, 3A, the relay TR and the relays H, L, 1TR, 2TR, and REB are adapted to be energized. But since the switch MS2 is in the zero position, contactors 2M, 1A, 2A, 3A, relay TR and relays H, L, 1TR and 2TR, are deenergized. The Motor is then deenergized and the maximum resistance is connected to its rotor circuit.

*Operation—Figs. 3A–3B*

Assume now that there is no load on the hook HO and that it is desired to lower the hook. The switch MS2 is then moved to lower position 1. The weight responsive rectifier RW and tachometer T are then connected in series with the input windings 103, 105, 113 of the inductors 1–Iu and 1–Id independently of the rectifier RH, but with no load on the hook, the output of the rectifier RW is substantially zero and with the Motor at rest the output of the tachometer is substantially zero so that initially the torque of the Motor remains at its stand-by magnitude.

In lower position 1 the contactor 2M is actuated and its contacts 301, 303, 305 are closed so that power is supplied to the field of the Motor. In addition, relay TR is energized and contact 367 closed so that the contactor 2M is supplied from conductors AL20 and AL19 independently of the switch MS2. In lower position 1 the relay REB is actuated and the brake B is released.

With the system as now set, the Motor is energized and exerts a torque in the lowering direction. As the Motor picks up speed, the tachometer increases the impedance of inductor 1–Id and reduces the impedance of inductor 1–Iu, reducing the down torque so that the speed is stabilized at about 30 to 40% of rated speed. Adjustments may be made by setting the vernier inductor 1VI in a position to deliver the desired potential. As can be seen from Fig. 4, the movement of the rotor of this inductor in either direction reduces the current flow through the input winding 113 of inductor 1–Id and increases the current flow through the input windings 103 and 105 of inductor 1–Iu. Thus, the down torque may be reduced and the up torque increased.

If it is desired that the Motor operate at a higher speed, the switch MS2 is moved to lower position 2. In this position, the resistance (391) in series with the rectifier RW and the tachometer T is increased so that the current from the tachometer T is reduced and the down speed becomes higher. To attain a still higher speed, the switch MS2 is moved to lower position 3 in which the resistance (391) in series with the rectifier RW and the tachometer T is further increased. By moving the switch to lower position 4, a still further increase in the speed of the Motor may be achieved in this way. To attain the maximum speed, the switch is moved to lower position 5. In this position, the relay L is actuated, opening the connection between the input windings 103, 105, 113 of the inductors 1–Iu and 1–Id and the rectifier RW and tachometer T. In addition, the winding 115 is connected to be supplied from conductors AL16 and AL17 and the vernier 1VI is disconnected from networks 1B1 and 1B2. The down torque is thus further increased. The relay 1TR is also actuated. This causes actuation of the contactor 2A which reduces the resistance in the secondary circuit of the rotor. The Motor now operates to the maximum speed to lower the hook. If there happens to be weight on the hook, it affects the speed of the Motor in lower positions 1, 2, 3 and 4. In lower position 5 the weight on the hook does not affect the Motor since relay L is actuated, but the switch MS2 is not set to this position in situations in which the weight on the hook is excessive.

Now assume that it is desired to hoist the hook HO without load on it. Under such circumstances, the switch MS2 is moved to hoist position 1. The rectifier 1RH is then supplied through the variable resistor 333 in series with it from conductors AL16 and AL17. Current is then supplied through the input windings of the inductors 1–Iu and 1–Id from the rectifier RW, the tachometer, and the rectifier 1RH. This current is initially supplied primarily by the rectifier 1RH and is sufficient to produce an up torque. The setting of the switch MS2 in hoist position 1 also actuates contactor 2M and relay TR. Power is then supplied to the Motor and it is energized, raising the hook. When the Motor rotates, the tachometer supplies a potential tending to counteract the effect of rectifier 1RH. As a result, the torque is balanced so that the hook is raised at a speed of about 30 to 40% rated speed.

If a higher speed is desired, the switch MS2 is moved to the hoist position 2. In this position, relay H is actuated. The actuation of relay H disconnects the inductor 1VI from the biasing network 1B2. The tendency of the inductor 1–Id to produce down torque is then further reduced. In addition, the rectifier 1RH is connected across the input windings of inductor 1–Iu directly and a portion of the resistance 333 in series with the conductors AL16 and AL17 which supply the rectifier 1RH is reduced so that the current flow through the rectifier 1RH is increased. This increases the up torque. Further, the rectifier RW and the tachometer T are disconnected from the input windings of the inductors 1–Id and 1–Iu and do not affect the Motor. The Motor now rotates at a speed determined by the rectifier 1RH. Additional speed over a relatively small range may be obtained by setting the vernier inductor 1VI to a position in which the excitation of the input windings 103 and 105 of inductor 1–Iu is increased.

To achieve a still higher speed, the switch MS2 is moved to position 3. In this case, an energizing circuit is provided for relay 1TR and contactor 1A, the latter through contact 377 of now closed relay H. When contactor 1A is actuated the resistance 11, 15, 19 in the rotor circuit is reduced and, in addition, the inductor 1–Iu is shunted out. The up torque of the Motor is now only limited by the resistance in the rotor circuit. This up torque may now be further reduced by movement of the switch MS2 to hoist position 4 in which case contactor 2A and relay 2TR are actuated. The Motor speed is then further increased. The maximum speed may be achieved by setting switch MS2 in position 5, in which case contactor 3A is actuated through the contacts of relay 2TR and reduces the rotor resistance to a minimum.

Conclusion

With the apparatus disclosed herein a full range of controllable torque may be obtained over a wide range of speeds, and particularly at low lowering speeds. This torque is obtained without resort to an artificial load, such as a load brake and without excessive input current to the Motor.

In carrying out this invention, certain compromises need be made. Thus, when the operation is at sub-synchronous speeds under the control of the inductors I$d$ and I$u$ or 1–I$u$ and 1–I$d$, resistance is connected to the rotor of the Motor. The magnitude of the ohmic component of this resistance sets the upper limit to which the current input to the Motor can rise, and for the purpose of limiting this current, it is desirable that the resistance be high. But the magnitude of this resistance also sets the upper limit to which the countertorque can rise, and it is desirable that this torque be as high as practicable. This demands that the resistance be low. In the practice of this invention, it has been found that a satisfactory compromise is effected with a resistance which results in input current in the range of 100% to 125% of rated current with 100% slip.

In the preferred practice of this invention, the inductors I$d$ and I$u$, or 1–I$d$ and 1–I$u$ are saturable reactors. The impedance of such reactors may be varied over a wide range by varying the direct current flowing through the input windings. Saturable reactors are available for use in the practice of this invention in which the impedance may be varied from .66 ohm to 110 ohms, that is, over a range of about 160 to 1.

The apparatus disclosed herein is a form of "closed loop" regulator in which the difference between the Motor torque and load torque is measured by measuring the speed of the Motor. In such a regulator, instability may result from the fact that the time response of the motor and its associated driving components may be smaller than that of the inductors I$d$ and I$u$, or 1–I$d$ and 1–J$\mu$. To avoid the difficulties which may arise from this difference, the variable torque which is under the control of the tachometer T and is thus responsive to the speed of the Motor is maintained small compared to the maximum. When the hook HO is loaded, the weight responsive rectifier RW brings the Motor torque to a magnitude very close to the magnitude of the torque exerted by the load. The difference between these two torques is variable. In the practice of this invention, the inductors are strongly excited and operate with a low time lag; any speed response resulting from the variable torque thus has a higher time lag than the inductors. With no load on the hook, the tachometer T is in command because the output of the load rectifier RW is zero, but the torque in this case developed by the Motor is not enough in excess of the friction in the system to move the hook HO and its associated components at a higher speed than that corresponding to the response of the inductor.

Further, it is to be kept in mind that while the weight responsive device including rectifier RW has important advantages in the practice of this invention, there is apparatus in accordance with this invention in which this component is not present and the apparatus includes only a speed responsive component such as tachometer T. Such apparatus is within the scope of this invention.

It is noted that in Figs. 1A and 1B and 2A and 2B the transformer 1Z and the transformer 5Z respectively, which supply the conductor L4, are energized in the stand-by condition of the apparatus when the contactors M and 1M are open. This is desirable in situations in which the transformers 1Z or the transformer 5Z is of the highly magnetizable type since in such situations the application of power to the transformers 1Z or 5Z result in a surge of current of substantial magnitude. In the modification shown in Figs. 1A and 1B and 2A and 2B, this surge is impressed when the power is first applied to conductors L1, L2 and L3 while contactors M or 1M are still open and the current flow through the transformers 1Z or 5Z has reached a steady state when power is ultimately supplied to the Motor by the closing of contactors M or 1M. Thus the surge is not applied to the Motor.

While specific embodiments of this invention have been disclosed herein, many modifications thereof are feasible. This invention then is not to be restricted except insofar as is necessitated by the prior art.

I claim as my invention:

1. Apparatus for controlling the supply of power to a motor from a three-phase supply comprising, in combination, first inductor means including input winding means and output winding means, second inductor means including input winding means and output winding means, means for connecting said motor to said supply through said output winding means of said inductor means so that a decrease in the impedance of said first inductor means tends to cause said motor to rotate in one direction and a decrease in the impedance of said second inductor means tends to cause said motor to rotate in the opposite direction, biasing means connected to the input winding means of said first inductor means to reduce the impedance of said first inductor means in the stand-by condition of said apparatus, first current supply means, means connecting in a first series circuit said first current supply means, said input winding means of said first inductor means and said input winding means of said second inductor means, said first current supply means counteracting at least in part the effect of said biasing means on the impedance of said first inductor means, second current supply means, means for interposing said second current supply means in said first series circuit in a sense such as to enhance the effect on the impedance of said inductor means of said first current supply means during an operating condition of said motor, third current supply means responsive to the load on said motor, fourth current supply means responsive to the speed of said motor, means for connecting in a second series circuit said second current supply means, said third current supply means, said fourth current supply means, said input winding means of said first inductor means and said input winding means of said second inductor means, said third current supply means enhancing the effect on the impedance of said inductor means of said first supply means and said fourth current supply means enhancing said effect of said third current supply means when said motor rotates in said one direction and reducing said effect of said third supply means when said motor rotates in said opposite direction.

2. Apparatus for controlling the supply of power to a motor having first, second and third terminals from a three-phase supply including first, second and third supply conductors comprising, in combination, first inductor means including input winding means and output winding means, second inductor means including input winding means and output winding means, a fourth conductor, means for connecting said fourth conductor in a duplex interconnected supply circuit with said first, second and third conductors, said supply circuit having opposite phase poles at said first and third and second and fourth conductors, means for connecting said output winding means of said first and second inductors in series with said second and fourth conductors, said first and second inductors then having an electrical junction, means for connecting said first conductor to said first terminal, means for connecting said third conductor to said third terminal, means for connecting said junction to said second terminal, biasing means connected to the input winding means of said first inductor means to reduce the impedance of said first inductor means in the stand-by condition of said apparatus, first current supply means, means connecting in a first series circuit said first current supply means, said input winding means of said first inductor means and said input winding means of said second inductor means, said first current supply means counteracting at least in part the effect of said biasing means on the impedance of said first inductor means, second current supply means, means for interposing said second current supply means in said first series circuit in a sense such as to enhance the effect on the impedance of said inductor means of said first current supply means during an operating condition of said motor, third current supply means responsive to the load on said motor, fourth current supply means responsive to the speed of said motor, means for connecting in a second series circuit said second current supply means, said third current supply means, said fourth current supply means, said input winding means of said first inductor means and said input winding means of said second inductor means, said third current supply means enhancing the effect on the impedance of said inductor means of said first supply means and said fourth current supply means enhancing said effect of said third current supply means when said motor rotates in said one direction and reducing said effect of said third supply means when said motor rotates in said opposite direction.

3. Apparatus for controlling the supply of power to a motor from a three-phase supply comprising, in combination, first inductor means including input winding means and output winding means, second inductor means including input winding means and output winding means, means for connecting said motor to said supply through said output winding means of said inductor means so that a decrease in the impedance of said first inductor means tends to cause said motor to rotate in one direction and a decrease in the impedance of said second inductor means tends to cause said motor to rotate in the opposite direction, means for producing a first potential the magnitude of which is dependent on the operation of the motor, a first circuit including said producing means and said input winding means of said first and second inductor means in series for impressing said potential across said last-named input winding means, means for impressing vernier potential, and a second circuit including said input winding means of said first and second inductor means in series and said vernier potential impressing means for impressing said vernier potential across said last named input winding means, said vernier potential being impressed independently of the first potential producing means.

4. Apparatus for controlling the supply of power to a motor from a three-phase supply comprising, in combination, first inductor means including input winding means and output winding means, second inductor means including input winding means and output winding means, means for connecting said motor to said supply through said output winding means of said inductor means so that a decrease in the impedance of said first inductor means tends to cause said motor to rotate in one direction and a decrease in the impedance of said second inductor means tends to cause said motor to rotate in the opposite direction, means for producing a first potential the magnitude of which is dependent on the operation of the motor, a first circuit including said producing means and said input winding means of said first and second inductor means in series for impressing said potential across said last-named input winding means, means for impressing a vernier potential, and a second circuit including said input winding means of said first and second inductor means in series and said vernier potential impressing means for impressing said vernier potential across said last named input winding means, said first circuit having a substantially higher resistance than said second circuit and said vernier potential being impressed independently of the first potential producing means.

5. Apparatus for controlling the supply of power to a motor from a three-phase supply comprising, in combination, first inductor means including input winding means and output winding means, second inductor means including input winding means and output winding means, means for connecting said motor to said supply through said output winding means of said inductor means so that a decrease in the impedance of said first inductor means tends to cause said motor to rotate in one direction and a decrease in the impedance of said second inductor means tends to cause said motor to rotate in the opposite direction, means for producing a first potential the magnitude of which is dependent on the operation of the motor, a first circuit including said producing means and said input winding means of said first and second inductor means in series for impressing said potential across said last-named input winding means, means for impressing a vernier potential, and a second circuit including said input winding means of said first and second inductor means in series and said vernier potential impressing means for impressing said vernier potential across said last named input winding means, said first potential being impressed in parallel with said vernier potential, said vernier potential being impressed independently of the first potential producing means.

6. Apparatus for controlling the supply of power to a motor from a three-phase supply comprising, in combination, first inductor means including input winding means and output winding means, second inductor means including input winding means and output winding means, means for connecting said motor to said supply through said output winding means of said inductor means so that a decrease in the impedance of said first inductor means tends to cause said motor to rotate in one direction and a decrease in the impedance of said second inductor means tends to cause said motor to rotate in the opposite direction, a first biasing network, a second biasing network, means connecting said first network to said input winding means of said first inductor means, means connecting said second network to said input winding means of said second inductor means, a first magnetic amplifier, a second magnetic amplifier a controller having a first position and a second position, means for producing a first potential dependent in magitude on the operation of the motor, means including said first amplifier for energizing said first network, means including said second amplifier for energizing said second network, means connected to said controller in its first position for impressing said first potential on said input winding means of said first and second inductor means, said first potential being poled to enhance the effect of said first biasing means on said first inductor means and reduce the effect of said second biasing means on said second inductor means, and means connected to said controller in its second position for energizing one of said biasing means independently of its associated amplifier and for deenergizing the other of said biasing means.

7. Apparatus for controlling the supply of power to a motor from a three-phase supply comprising, in combination, first inductor means including input winding means and output winding means, second inductor means including input winding means and output winding means, means for connecting said motor to said supply through said output winding means of said inductor means so that a decrease in the impedance of said first inductor means tends to cause said motor to rotate in one direction and a decrease in the impedance of said second inductor means tends to cause said motor to rotate in the opposite direction, a first biasing network, a second biasing network, means connecting said first network to said input winding means of said first inductor means, means connecting said second network to said input winding means of said second inductor means, a first magnetic amplifier, a second magnetic amplifier, each of said amplifiers having output winding means and control winding means, a controller having a first position and a second position, means for producing a first potential dependent in magnitude on the operation of the motor, means including said output winding means of said first amplifier for energizing said first network, means including said output winding means of said second amplifier for energizing said second network, means connected in common to the control winding means of both said amplifier means for supplying control current thereto, the output at the output winding means of said first amplifier means decreasing as said current increases and the output at the output winding means of said second amplifier means increasing as said current increases, means connected to said controller in its first position for impressing said first potential on said input winding means of said first and second inductor means, said first potential being poled to enhance the effect of said first biasing means on said first inductor means and reduce the effect of said second biasing means on said second inductor means, and means connected to said controller in its second position for energizing one of said biasing means independently of its associated amplifier and for deenergizing the other of said biasing means.

8. Apparatus for controlling the supply of power to a motor from a three-phase source comprising, in combination first inductor means including input winding means and output winding means, second inductor means including input winding means and output winding means, means connected to said motor and to said output winding means for connecting said motor in circuit with said source and said output winding means so that a decrease in the impedance of said output winding means of said first inductor means tends to cause said motor to rotate in one direction and a decrease in the impedance of said output winding means of said second inductor means tends to cause said motor to rotate in the opposite direction, first magnetic amplifier means having control winding means and output winding means, second magnetic amplifier means having control winding means and output winding means, means connecting said output winding means of said first amplifier means to said control winding means of said first inductor means, to supply control current to said last-named winding means, means connecting said output winding means of said second amplifier means to said control winding means of said second inductor means, to supply control current to said last-named means, and control means connected to said input winding means of said amplifier means to impress control potential on said control winding means of said amplifier means.

9. Apparatus for controlling the supply of power to a motor from a three-phase source comprising in combination first inductor means including input winding means and output windings means, second inductor means including input winding means and output winding means, means connected to said motor and to said output winding means for connecting said motor in circuit with said source and said output winding means so that a decrease in the impedance of said output winding means of said first inductor means tends to cause said motor to rotate in one direction and a decrease in the impedance of said output winding means of said second inductor means tends to cause said motor to rotate in the opposite direction, first magnetic amplifier means having control winding means and output winding means, second magnetic amplifier means having control winding means and output winding means, means connecting said output winding means of said first amplifier means to said control winding means of said first inductor means to supply control current to said last-named winding means, means connecting said output winding means of said second amplifier means to said control winding means of said second inductor means, to supply control current to said last-named means, and control means connected in common to said input winding means of both said amplifier means to impress control potential on said control winding means of said amplifier means, variation in such control potential producing in response to said variation a change in one sense in the control current supplied by said first amplifier means and a change in the opposite sense of the control current by said second amplifier means.

10. Apparatus for controlling the supply of power to a motor from a three-phase source comprising in combination, first inductor means including input winding and output winding means, second inductor means including input winding means and output winding means, means connected to said motor and to said output winding means for connecting said motor in circuit with said source and said output winding means so that a decrease in the impedance of said output winding means of said first inductor means tends to cause said motor to rotate in one direction and a decrease in the impedance of said output winding means of said second inductor means tends to cause said motor to rotate in the opposite direction, first magnetic amplifier means having control winding means and output winding means, second magnetic amplifier means having control winding means and output winding means, means connecting said output winding means of said first amplifier means to said control winding means of said first inductor means, to supply control current to said last-named winding means, means connecting said output winding means of said second amplifier means to said control winding means of said second inductor means to supply control current to said last-named means, and control means connected to said input winding means of said amplifier means to impress control potential on said control winding means of said amplifier means, means for producing a potential dependent on the operation of said motor, and means directly connected to said control winding means of said inductor means for impressing said dependent potential thereon.

11. Apparatus for controlling the supply of power to a motor from a three-phase supply comprising, in combination, first inductor means including input winding means and output winding means, second inductor means including input winding means and output winding means, means for connecting said motor to said supply through said output winding means of said inductor means so that a decrease in the impedance of said first inductor means tends to cause said motor to rotate in one direction and a decrease in the impedance of said second inductor means tends to cause said motor to rotate in the opposite direction, means for producing a first potential the magnitude of which is dependent on the operation of the motor, a first circuit including said producing means and said input winding means of said first and second inductor means in series for impressing said potential across said last-named input winding means, means for impressing vernier potential, and a second circuit including said input winding means of said first and second inductor means and said vernier potential impressing means for impressing said vernier potential across said last-named input winding means, said vernier potential being impressed independently of the first potential producing means.

12. Apparatus for controlling the supply of power to a motor from a three-phase supply comprising, in combination, first inductor means including input winding means and output winding means, second inductor means including input winding means and output winding means, means for connecting said motor to said supply through said output winding means of said inductor means so that a decrease in the impedance of said first inductor means tends to cause said motor to rotate in one direction and a decrease in the impedance of said second inductor means tends to cause said motor to rotate in the opposite direction, means for producing a first potential the magnitude of which is dependent on the operation of the motor, a first circuit including said producing means and said input winding means of said first and second inductor means in series for impressing said potential across said last-named input winding means, means for impressing vernier potential, and a second circuit including said input winding means of at least one of said inductor means and said vernier potential impressing means for impressing said vernier potential across said last-named input winding means, said vernier potential being impressed independently of the first potential producing means.

References Cited in the file of this patent
UNITED STATES PATENTS

| | | |
|---|---|---|
| 2,774,923 | Wickerham | Dec. 18, 1956 |
| 2,832,024 | Wickerham | Apr. 22, 1958 |